United States Patent [19]

Takayama et al.

[11] Patent Number: 4,984,095
[45] Date of Patent: Jan. 8, 1991

[54] VIDEO SIGNAL PROCESSING APPARATUS HAVING DELAY MEANS FOR VARIED USES

[75] Inventors: Makoto Takayama, Kanagawa; Tsuguhide Sakata; Tomotaka Muramoto, both of Tokyo, all of Japan

[73] Assignee: Canon Kabushiki Kaisha, Tokyo, Japan

[21] Appl. No.: 317,051

[22] Filed: Feb. 27, 1989

Related U.S. Application Data

[63] Continuation of Ser. No. 17,001, Feb. 19, 1987, abandoned, which is a continuation of Ser. No. 545,750, Oct. 26, 1983, abandoned.

[30] Foreign Application Priority Data

Oct. 27, 1982 [JP] Japan .................. 57-189688

[51] Int. Cl.$^5$ ............................................. H04N 5/94
[52] U.S. Cl. ..................... 358/336; 358/314; 360/38.1
[58] Field of Search ................. 360/10.1, 38.1; 358/160, 312, 314, 326, 336, 342

[56] References Cited

U.S. PATENT DOCUMENTS

| | | | |
|---|---|---|---|
| 2,996,576 | 8/1961 | Dolby | 360/38.1 |
| 3,949,416 | 4/1976 | Stalley et al. | 358/314 |
| 3,990,107 | 11/1976 | Hanma et al. | 360/10.1 |

FOREIGN PATENT DOCUMENTS

| | | | |
|---|---|---|---|
| 0073468 | 3/1983 | European Pat. Off. | 358/336 |
| 57-103480 | 6/1982 | Japan | 358/314 |

Primary Examiner—Stuart S. Levy
Assistant Examiner—James E. Tomassini
Attorney, Agent, or Firm—Robin, Blecker, Daley & Driscoll

[57] ABSTRACT

Video signal processing apparatus in which a reproduced signal and a delayed video signal produced by a delay mechanism are selectively produced and supplied to the delay mechanism and the delayed video signal produced by the delay mechanism is mixed with the video signal to be supplied to the delay mechanism.

22 Claims, 4 Drawing Sheets

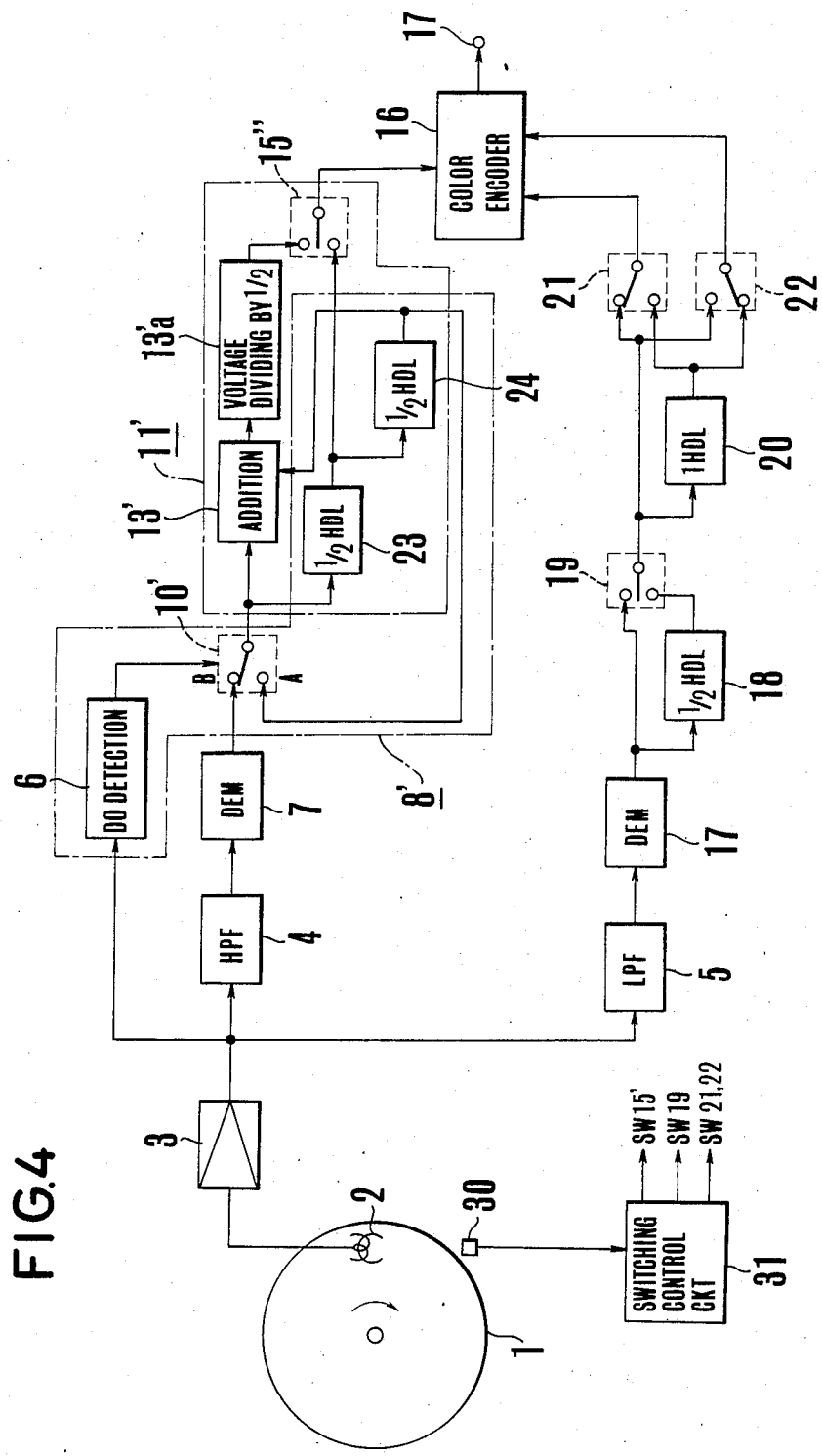

VIDEO SIGNAL PROCESSING APPARATUS HAVING DELAY MEANS FOR VARIED USES

This application is a continuation of application Ser. No. 017,001, filed Feb. 19, 1987, now abandoned, which is a continuation of application Ser. No. 545,750, filed Oct. 26, 1983, now abandoned.

BACKGROUND OF THE INVENTION

1. Field of the Invention

This invention relates to a video signal reproducing apparatus and more particularly to a video signal reproducing apparatus arranged to obtain a video signal by performing a continuous reproducing operation on one and the same recording track containing one field portion of a video signal which is arranged to have one frame thereof consist of two fields.

2. Description of the Prior Art

This specification deals by way of example with magnetic sheet reproducing apparatuses of the kind arranged to obtain a still picture by continuously reproducing a video signal which corresponds to one field portion of a television signal and is recorded in one of the circular recording tracks formed on a magnetic recording sheet.

In apparatus of this kind, a television signal duly consisting of first and second field portions (hereinafter called a full-field signal) is arranged to be obtained from one and the same field portion of the video signal. Compared with an ordinary full-field television signal, resolution in the vertical direction of a signal reproduced by this arrangement becomes ½ of the ordinary, full-field television signal. A conventional practice in solving this problem has involved obtaining a video signal (hereinafter called an averaging video signal) by taking an average level of a video signal obtained during two adjoining horizontal scanning periods within one reproduced field portion of the video signal. Then, a signal processing operation is performed to improve the resolution in the vertical direction in such a manner that the scanning lines on a picture resulting from the average video signal are arranged to be between scanning lines on a picture resulting from the video signal of the two adjacent horizontal synchronizing periods.

FIG. 1 of the accompanying drawings shows by way of example a video signal reproducing apparatus using the conventional method. The video signal reproducing apparatus of this example is arranged to reproduce one field portion of a color picture signal recorded in one circular recording track on a magnetic sheet 1. In the recording method of the apparatus, a brightness signal (hereinafter called a signal Y) is FM modulated in such a way as to be located within a relatively high frequency zone. As for color signals, two color difference signals B-Y and R-Y are arranged to be line sequential. The line sequential color difference signals are FM modulated to have them within a relatively low frequency zone. A color video signal obtained by mixing these signals is recorded. The symbols B and R shown above respectively represent a blue signal B and a red signal R. Again referring to FIG. 1, the illustration includes a magnetic head 2 which is arranged to reproduce a video signal by repeatedly tracing, the above-stated circular recording track accordingly as the magnetic recording sheet 1 rotates. The video signal obtained from the head 2 is supplied via a pre-amplifier 3 to a high-pass filter 4 (hereinafter called HPF for short), a low-pass filter 5 (hereinafter called LPF) and a drop-out detection circuit 6 respectively.

At the HPF 4, an FM modulated brightness signal is separated and is demodulated at an FM demodulator 7. The demodulated brightness signal is supplied to a drop-out compensation circuit 8. A delay line 9 (hereinafter called a 1 HDL) which is arranged to effect a delay by one horizontal scanning period. A signal which passes through this 1 HDL 9 and a signal which does not pass through the 1 HDL 9 are supplied to a switch 10. The switch 10 is connected to one side A thereof when a drop-out is detected and to another side B with no drop-out detected. When a drop-out exists in the demodulated brightness signal, the signal is thus replaced with a signal preceding it by one horizontal scanning period (hereinafter called 1 H), so that the drop-out can be compensated for.

The output of the switch 10 is thus supplied in the above-stated manner to a circuit 11 which is arranged to increase resolution in the vertical direction. FIG. 2 is a timing chart which schematically shows signals (a)-(d) obtained at different elements disposed within the resolution increasing circuit 11. A reference numeral 12 included in the circuit 12 denotes a 1 HDL. The output of the 1 HDL 12 (see (b) in FIG. 2) and a signal which does not come through the 1 HDL 12 are added by an adder 13. Incidentally, in cases where a television signal is to be obtained by continuously reproducing one field portion of a video signal, if, for example, the one field portion of the video signal is composed of an odd multiple of ½ H, the period of the horizontal synchronizing signal comes out of order at a joint between one field portion of the video signal and another. For example, in the case of a video signal having one field portion thereof consisting of 265.5 H pursuant to the NTSC system, the horizontal synchronizing signal deviates by ½ H. In view of this, the circuit 11 includes a ½ HDL 14 which is arranged to compensate for such a ½ H deviation that takes place when one field portion of a video signal is continuously reproduced. The circuit 11 further includes a switch 15 which is arranged to alternately produce the output signal of the adder 13 (see (d) in FIG. 2) and the output signal of the ½ HDL 14 (see (c) in FIG. 2) by effecting a switch-over between them for every field period. As a result, the video signal will include the signal shown at (d) in FIG. 2 for a first field and the signal shown at (c) in FIG. 2 for a second field. A picture thus obtained will have a scanning line of the first field which is obtained by averaging them interposed between two adjacent scanning lines of the second field. The output terminal of the adder 13 is connected to the switch 15 via a ½ voltage divider 13a provided for level adjustment. The brightness signal produced from the switch 15 is supplied to a color encoder circuit 16 for making it into a television signal of the NTSC system or the like. The television signal thus obtained is arranged to be produced from an output terminal 17.

Meanwhile, the FM modulated line sequential color difference signals separated at the LPF 5 are demodulated at the FM demodulator 17. Then, the demodulated signals are corrected for the above-stated ½ H deviation by a ½ HDL 18 and a switch 19. The signal then passes through a 1 HDL 20 and both the signals which do and do not pass therethrough are respectively supplied to switches 21 and 22. These switches 21 and 22 are arranged to shift their positions at every H. When the switch 21 produces the signal which has passed through the 1 HDL 20, the switch 22 produces the signal which has not passed through the 1 HDL 20. Conversely, when the switch 21 produces the signal not having passed through the 1 HDL 20, the other switch 22 produces the signal which is produced from the 1 HDL 20. Each of the switches 21 and 22 thus produces only one color difference signal. The color difference signal obtained via each of the switches 21 and 22 is supplied to the color encorder circuit 16. The illustration of FIG. 1 further includes a detector 30 which detects the circuit phase of the sheet 1 and a circuit 31 which is arranged to produce a switching control signal for controlling the switches 15, 19, 21 and 22.

The apparatus which is arranged as described in the foregoing is capable of enhancing the resolution in the vertical direction. However, the arrangement of the apparatus necessitates provision of many delay means such as the 1 HDL's and the ½ HDL's as shown in FIG. 1. The prior art arrangement thus has presented a problem in respect to practicability. Further, it has been another problem with such arrangement that the apparatus inevitably becomes cumbersome.

SUMMARY OF THE INVENTION

It is therefore a general object of the present invention to solve the above-stated problems of the prior art arrangements.

It is a more specific object of the invention to provide a compact and low-cost video signal reproducing apparatus in which the above-stated delay means for drop-out compensation is also used for increasing the resolution in the vertical direction.

It is another object of the invention to provide a compact and low-cost video signal reproducing apparatus in which the delay means for drop-out compensation is arranged to be used also for correction of the above-stated ½ H deviation.

It is a further object of the invention to provide a compact and low-cost video signal reproducing apparatus in which delay means provided for increasing resolution in the vertical direction is used also for correction of the above-stated ½ H deviation.

It is a still further object of the invention to provide a video signal reproducing apparatus which comprises reproducing means for reproducing a video signal from a recording medium; delay means for producing therethrough an incoming video signal by delaying it for a predetermined period of time; switching means for selectively and alternately producing the video signal reproduced by the reproducing means and the video signal produced via the delay means, the video signal produced via the switching means being arranged to be supplied to the delay means; and computing means for computing the video signal produced via the delay means and the video signal produced via the switching means.

These and further objects and features of the invention will become clear from the following detailed description of the preferred embodiments thereof taken in connection with the accompanying drawings.

BRIEF DESCRIPTION OF THE DRAWINGS

FIG. 4 is a block diagram showing a video signal reproducing apparatus which is another embodiment of the invention.

DETAILED DESCRIPTION OF THE PREFERRED EMBODIMENTS

Figure 1:
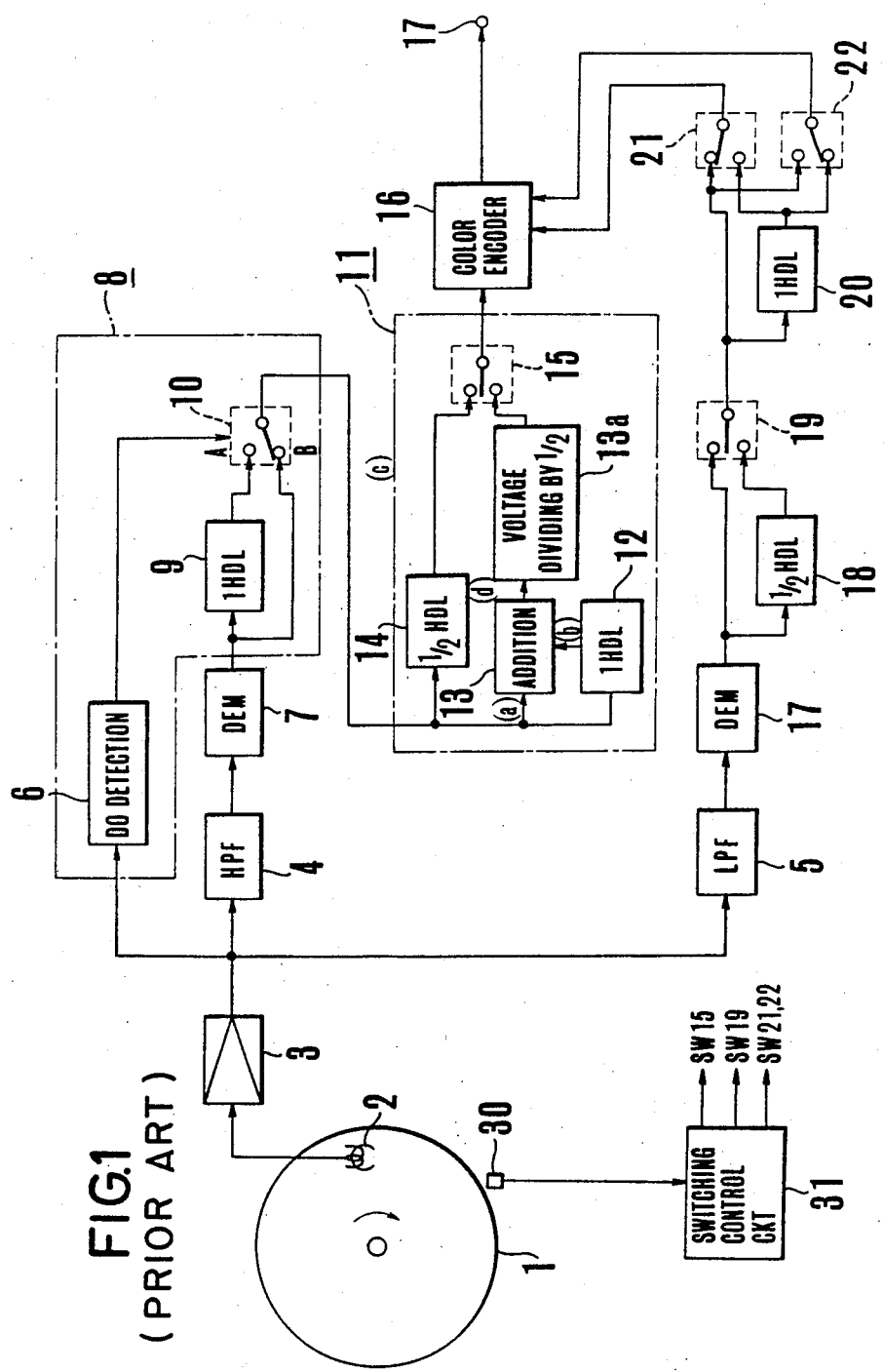
FIG. 1 is a block diagram showing an example of the conventional video signal reproducing apparatus.
Figure 2:
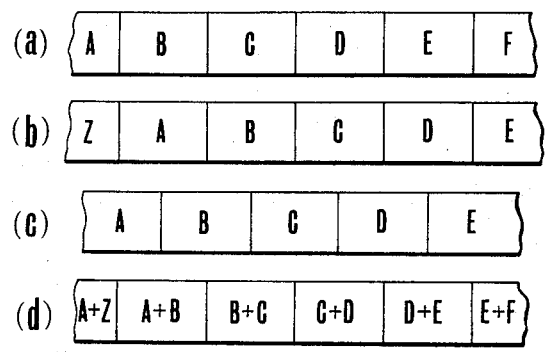
FIG. 2 is a timing chart schematically showing signals produced from different component elements of the apparatus shown in FIG. 1.
Figure 3:
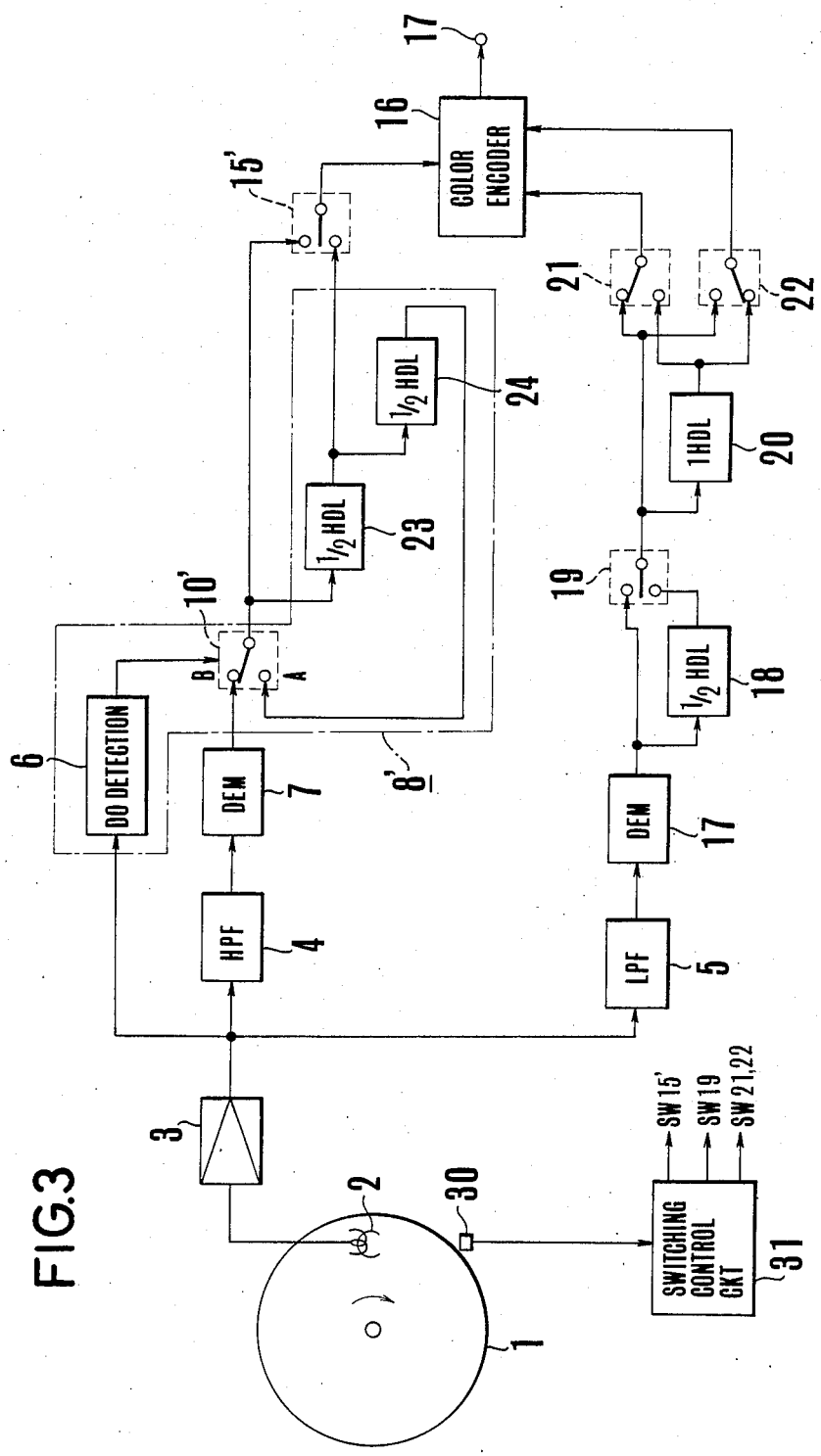
FIG. 3 is a block diagram showing a video signal reproducing apparatus which is an embodiment of the present invention.

In FIG. 3 which shows a video signal reproducing apparatus as an embodiment of the invention, the same component elements as those of the apparatus shown in FIG. 1 are indicated by the same reference that numerals and are described below briefly but sufficiently so they can be understood. The embodiment includes a drop-out compensation circuit 8'. When a drop-out is detected by the drop-out detection circuit 6, a switch 10' shifts from one side B to the other side A thereof as shown in FIG. 3. The side A of the switch 10' is arranged to receive the output of a ½ HDL 24 which is arranged to delay the output signal of the switch 10' by 1 H in conjunction with another ½ HDL 23. In other words, the arrangement is such that, within the part encompassed with a dotted chain line as shown in FIG. 3, the drop-out portion of a video signal is replaced with the video signal obtained 1 H prior thereto by virtue of the feedback loop. The other ½ HDL 23 is provided for the purpose of compensating for ½ H deviation as mentioned in the foregoing. The video signal produced from the switch 10' is supplied to one terminal of a switch 15'. Meanwhile, the video signal produced via the ½ HDL 23 is supplied to the other terminal of the switch 15'. The switch 15' shifts its connection from one terminal to the other for every one field period. For example, the output of the ½ HDL 23 is obtained for a first field and the output of the switch 10' for a second field. Therefore, the horizontal synchronizing signal of the video signal produced from the switch 15' appears at every H (horizontal scanning period) even at the time of field shifting.

With the embodiment arranged as described above, the ½ HDL 23 can be used for both the drop-out compensation and the correction of ½ H deviation mentioned in the foregoing. Therefore, although the number of delay lines remains unchanged from that of the conventional apparatus, the arrangement of the embodiment permits the 1 HDL to be replaced with the ½ HDL for reduction in size and cost. Further, unlike the arrangement of FIG. 1, the arrangement of this embodiment does not include the circuit for improvement in resolution in the vertical direction mentioned in the foregoing.

FIG. 4 shows a video signal reproducing apparatus which is another embodiment of the invention. The same component elements as those included in the preceding embodiment shown in FIG. 3 are indicated by the same reference numerals in FIG. 4.

The embodiment shown in FIG. 4 includes a vertical resolution increasing circuit 11' which is arranged to increase resolution in the vertical direction as mentioned in the foregoing and is encompassed within a dotted chain line in FIG. 4. The operation of the circuit 11' is similar to that of the circuit 11 shown in FIG. 1. An adder 13' adds up a video signal produced from the switch 10' which is added to a signal obtained by passing the video signal through the ½ HDL 23 and ½ HDL 24 which are used also in the above-stated drop-out compensation circuit 8'. In the same manner as in the arrangement shown in FIG. 3, the ½ HDL 23 is also arranged to serve as a ½ HDL for correction of ½ H deviation. The output of the ½ HDL 23 is thus supplied to a switch 15''. The switch 15'' is arranged to selectively and alternately produce the video signal which is voltage divided at a ½ voltage divider 13a' after it is produced from the adder 13 and the video signal which is produced from the ½ HDL 23 by switching over these video signal outputs from one to the other for every one field period. The video signal which is produced from the ½ HDL 23 via the switch 15'' is arranged for the first field while the video signal produced from the adder 13' via the switch 15'' is arranged for the second field. As a result of this arrangement, like in the case of the circuit 11 shown in FIG. 1, the scanning lines of the first field which are obtained by averaging the two adjacent scanning lines of the second filed come to interpose between adjacent scanning lines of the second field to give a picture of full-field arrangement having improved resolution in the vertical direction.

The color signal circuit arrangement of the embodiment is identical with that of the apparatus shown in FIG. 1 and thus requires no further description.

With the embodiment arranged as described above, it performs the same function and gives the same effects as in the case of the arrangement shown in FIG. 1. In this case, however, the ½ HDL 23 and the ½ HDL (1 HDL) are used both for drop-out compensation and for improvement in resolution in the vertical direction, so that the number of delay lines required can be lessened for simplification of circuit arrangement. The embodiment is highly advantageous for reduction in size and cost of the apparatus. Further, in the case of this embodiment, the ½ HDL for correcting the ½ H deviation is utilized also for improved resolution in the vertical direction, so that the delay line can be more efficiently utilized.

In the embodiment examples given in the foregoing, the invention is applied by way of example to magnetic sheet reproducing apparatuses of the kind adapted for obtaining a still picture by continuously reproducing a video signal which is recorded in each of concentric recording tracks on a rotary magnetic sheet and which corresponds to one field of a television signal. However, the great advantageous effect of the invention is also attainable by applying it to any other video signal reproducing apparatus that is adapted for obtaining a continuous video signal by continuously performing a reproducing operation at least twice on one and the same recording tracks in which one field portion of a video signal is recorded with the video signal arranged to have one frame composed of two fields. For example, the invention can be advantageously applied to such apparatuses as video tape recorders of the types called the field-skip type and field-still type.

Further, the foregoing description has been given only for the case where the horizontal synchronizing signal deviation is ½ H when one field portion of a video signal is continuously reproduced. However, this deviation is dependent on and varies with the number of horizontal scanning lines forming one field. For example, the ½ HDL 23 should be changed to ⅓ HDL and the ½ HDL to ⅔ HDL in cases where this deviation is ⅓ H.

What we claim:

1. A video signal reproducing apparatus, comprising:
   reproducing means for reproducing a video signal from a recording medium;
   first delay means for delaying the video signal supplied thereto for a first predetermined period of time to produce a first delayed video signal;
   second delay means for further delaying the first delayed video signal produced by said first delay means for a second predetermined period of time to produce a second delayed video signal;
   first switching means for selectively producing the video signal reproduced by said reproducing means and said second delayed video signal produced by said second delay means, the video signal produced from said first switching means being arranged to be supplied to said first delay means; and
   second switching means for selectively producing the video signal produced by said first switching means and the first delayed video signal produced by said first delay means.

2. An apparatus according to claim 1, further comprising:
   detection means for detecting a drop-out in said video signal reproduced by said reproducing means, said detection means being arranged to control said first switching means.

3. An apparatus according to claim 2, wherein the sum of said first and second predetermined periods of time is equal to one horizontal scanning period.

4. An apparatus according to claim 3, wherein said first predetermined period of time is ½ horizontal scanning period.

5. An apparatus according to claim 4, further comprising control means for causing said second switching means to alternately produce the two inputs thereof for every vertical scanning period.

6. An apparatus according to claim 1, wherein said second switching means alternately and selectively produces the video signal every vertical scanning period.

7. An apparatus according to claim 6, further comprising mixing means for mixing the video signal supplied to said first delay means and the second delayed video signal produced by said second delay means.

8. A video signal processing system, comprising:
   first delay means for delaying a video signal supplied thereto for a first predetermined period of time to produce a first delayed video signal;
   second delay means for further delaying the first delayed video signal produced by said first delay means for a second predetermined period of time to produce a second delayed video signal;
   mixing means for mixing the video signal supplied to said first delay means and the second delayed video signal produced by said second delay means; and
   first switching means for selectively and periodically producing the video signal produced from said mixing means and the first delayed video signal produced by said first delay means;
   wherein the sum of said first predetermined period of time and said second predetermined period of time is equal to one horizontal scanning period.

9. A system according to claim 8, further comprising reproducing means for reproducing a video signal from a recording medium; and second switching means for selectively producing the video signal reproduced by said reproducing means and said second delayed video signal produced by said second delay means, the video signal produced from said second switching means being arranged to be supplied to said first delay means.

10. A system according to claim 9, wherein the sum of said first predetermined period of time and said second predetermined period of time is equal to one horizontal scanning period.

11. A system according to claim 10, wherein said first predetermined period of time is ½ horizontal scanning period.

12. A system according to claim 9, further comprising control means for causing said first switching means to alternately select one of the two inputs thereof for every vertical scanning period.

13. A system according to claim 9, further comprising detection means for detecting a drop-out in the video signal reproduced by said reproducing means, said detection means being arranged to control said second switching means.

14. A video signal reproducing apparatus, comprising:
means for supplying a video signal;
first delay means for delaying the video signal supplied thereto for a first predetermined period of time to produce a first delayed video signal;
second delay means for further delaying the first delayed video signal produced by said first delay means for a second predetermined period of time to produce a second delayed video signal;
first switching means for selectively producing the video signal supplied by said supplying means and said second delayed video signal produced by said second delay means, the video signal produced from said first switching means being arranged to be supplied to said first delay means; and
second switching means for selectively producing the video signal produced by said first switching means and the first delayed video signal produced by said first delay means.

15. A device according to claim 14, further comprising:
detection means for detecting a dropout in said video signal reproduced by said supply means, said detection means being arranged to control said first switching means.

16. A device according to claim 14, wherein the sum of said first and second predetermined periods of time is equal to one horizontal scanning period.

17. A device according to claim 14, wherein said first predetermined period of time if ½ horizontal scanning period.

18. A device according to claim 14, further comprising control means for causing said second switching means to alternately produce the two inputs thereof for every vertical scanning period.

19. A video signal processing device, comprising:
(a) compensating means for compensating a ½ H deviation of a video signal, said compensating means including,
(A) first delay means for delaying a video signal for a substantial half horizontal period; and
(B) first switching means for alternately switching the video signal delayed by said first delay means and a video signal not delayed by said first delay means at a predetermined interval; and
(b) process means for delaying said video signal for a predetermined period longer than said half horizontal period, said process means including second delay means, which is used in cascade relatively to said first delay means.

20. A video signal processing device comprising:
(a) compensating means for compensating a ½ H deviation of a video signal, said compensating means including,
(A) first delay means for delaying a video signal for substantial half horizontal period; and
(B) first switching means for alternately switching the video signal delayed by said first delay means and a video signal not delayed by said first delay means at a predetermined interval;
(b) process means for delaying said video signal for a predetermined period longer than said half horizontal period, said process means including second delay means, which is used in cascade relatively to said first delay means;
(c) detecting means for detecting a dropout of said video signal; and
(d) switching means for selectively producing the video signal delayed by said process means or the video signal not delayed by said process means, depending upon and output of said detecting means.

21. A video signal processing device comprising:
(a) compensating means for compensating a ½ H deviation of a video signal, said compensating means including,
(A) first delay means for delaying a video signal for substantial half horizontal period; and
(B) first switching means for alternately switching the video signal delayed by said first delay means and a video signal not delayed by said first delay means at a predetermined interval;
(b) process means for delaying said video signal for a predetermined period longer than said half horizontal period, said process means including second delay means, which is used in cascade relatively to said first delay means, said second delay means being arranged to delay the video signal for a half of a horizontal scanning period.

22. A video signal processing device comprising:
(a) compensating means for compensating a ½ H deviation of a video signal, said compensating means including,
(A) first delay means for delaying a video signal for substantial half horizontal period; and
(B) first switching means for alternately switching the video signal delayed by said first delay means and a video signal not delayed by said first delay means at a predetermined interval;
(b) process means for delaying said video signal for a predetermined period longer than said half horizontal period, said process means including second delay means, which is used in cascade relatively to said first delay means;
(c) producing means for producing a mixed video signal from the video signal delayed by said process means and the video signal not delayed by said process means; and
(d) second switching means for alternately selecting the mixed video signal mixed by said producing means and the video signal not delayed by said process means at said predetermined interval.

* * * * *